UNITED STATES PATENT OFFICE.

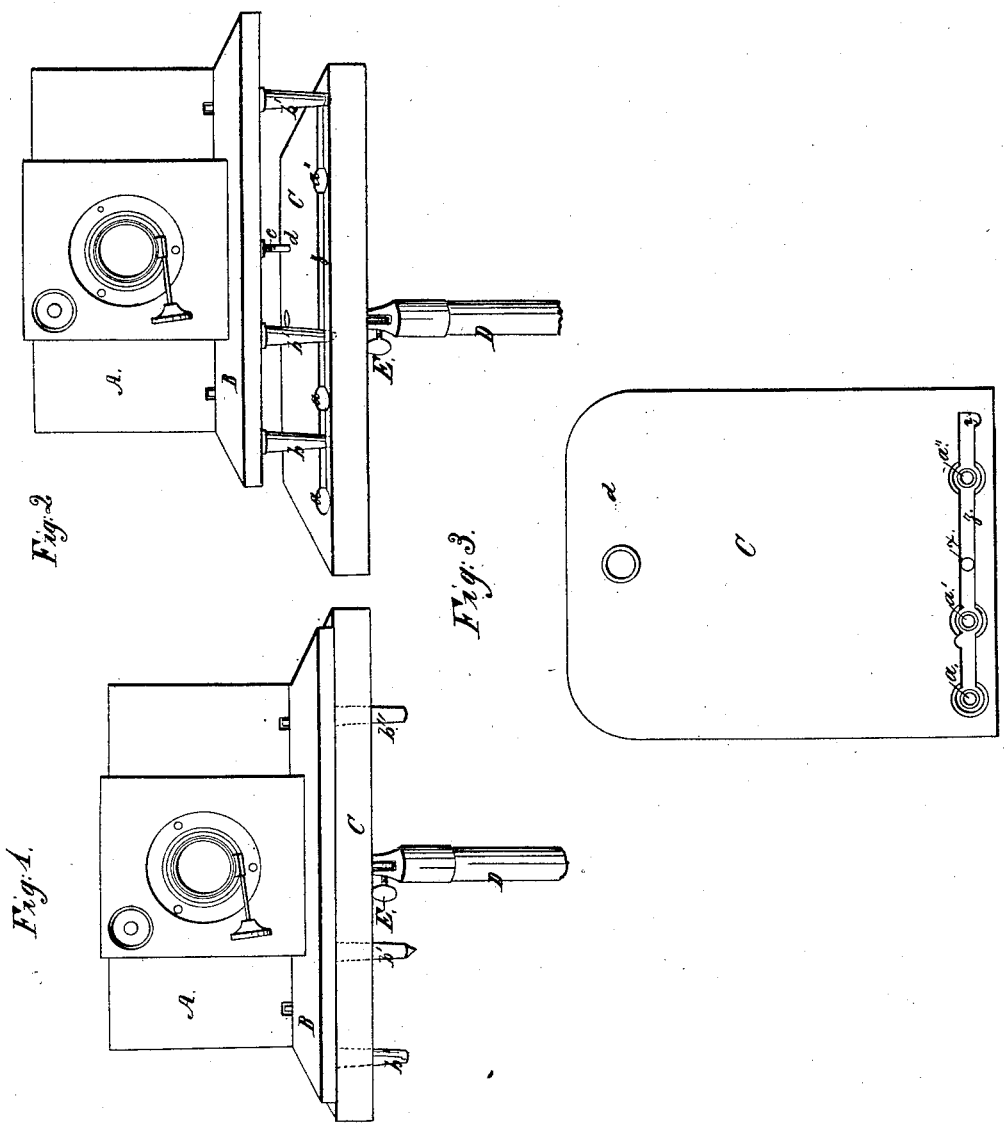

ALBERT S. SOUTHWORTH AND JOSIAH J. HAWES, OF BOSTON, MASSACHUSETTS.

IMPROVEMENT IN TAKING DAGUERREOTYPES FOR STEREOSCOPES.

Specification forming part of Letters Patent No. 11,304, dated July 11, 1854.

*To all whom it may concern:*

Be it known that we, ALBERT S. SOUTHWORTH and JOSIAH J. HAWES, of Boston, in the county of Suffolk and State of Massachusetts, have invented a new and useful Improvement in the Art of Taking Daguerreotype Pictures for Stereoscopes, of which the following is a full, clear, and exact description, reference being had to the annexed drawings, making part of this specification.

The stereoscope is an instrument in which two different views of nature are so arranged that each of them is seen by one of the eyes only, the two being combined into one image, so as to produce an effect upon the organs of vision similar to that produced by the solidity of natural objects and the intervening space between them. In viewing nature we can instantly change the place or position of the eyes and quickly become familiar with many different views of the same object, the universal joint of the neck enabling us to bring the line passing through the center of the eyes into any required position from the horizontal to the vertical. We can thus judge of solids and distances not by the combined images of each eye at the instant, but by what we remember of the images just passed from vision combined with those now in view. In the stereoscope, however, the images are fixed, as is also the position of the eyes, and there can consequently be but one image formed upon the retina. It is proper, therefore, that we should select the two images which are to be placed in the stereoscope, in order to give us the most correct idea of the objects represented, and it therefore becomes necessary to determine at what angle they shall be taken or what relation the two points of sight shall bear to each other. Professor Wheatstone, Sir David Brewster, and others have given the extremes of the base line of vision or the distance between the two eyes as the points at which the pictures should be taken. This distance is, upon an average, two and a half inches. In every instance, however, where we have made use of this distance, the two positions being upon a horizontal line, the result has been distortion and a misrepresentation of the object, and after repeated experiments we have discovered that it is necessary that the two points should be separated vertically an amount equal to the distance which separates them horizontally.

It is not material whether the pictures be taken at the same instant with two cameras or with two sets of lenses with the same camera, or whether they be taken one after the other, provided there is no change of place in the objects themselves between the time of taking the two pictures.

Before proceeding to describe the method which we have adopted for carrying out our invention we will give the following illustrations: Suppose a series of columns supporting a cylinder. If the two points of view be taken upon the same horizontal line, we are enabled to see round the columns; but the second view of the cylinder is the same as the first, and it is not relieved from the background at all, but appears to touch all that is behind it. This is the case with all horizontal lines. In a similar manner if the position from which the second view is taken be from a point vertically above or beneath the first point the outline of the columns will be the same, though different views of the cylinder will be obtained. To unite, therefore, the advantages resulting from separating the points of view vertically as well as horizontally is the object of our invention, which consists in taking the two pictures from the extreme ends of the hypotenuse of a right-angle triangle, one of the sides of which is horizontal and the other vertical, each of the sides being two and one-half inches, or thereabout, in length. Thus, having made one picture or selected one point of view, there are four other points from which views may be taken that will combine accurately without distortion from the first. These points are the four angles of a square whose sides are five inches, the first point of view being the center of the square or the intersection of its diagonals. It is evident that when the picture is taken and the camera ranged to the center of the views to be pictured the second position of the lens will, according to this adjustment, be equally distant and have the same center in the view, so that there will be no change of focus necessary. We sometimes, however, take the first picture with the focus adjusted to nearer objects, and the second to distant ones, with a fine effect, the two coallescing in the stereoscope and forming a perfect picture, presenting at the same time the perfect foreground and the perfect background, the imperfections of the individual pictures not being apparent.

To enable others skilled in the art to make and use our invention, we will proceed to describe one of the methods by which it may be carried out.

Figures 1 and 2 are views of a camera in the two positions in which our pictures are taken; Fig. 3, a plan of the table upon the top of the tripod and upon which the camera is placed.

A is the camera, which does not differ materially from those in common use.

B is the bottom or floor of the same, which is made to extend out all round to near the size of the table upon which it rests.

C is the table secured upon the top of the tripod-shaft D, and capable of adjustment thereto by means of the set-screw E. Near the front edge of the table C are three holes $a\ a'\ a''$, which are united by a groove or gutter Z, which is ploughed slightly beneath the surface of the table. This groove has a depression $x$, two and one-half inches horizontally from the center of the hole $a'$, and an enlargement $y$ the same distance from the hole $a''$, the object of which will be explained hereinafter.

$b\ b'\ b''$ are pins projecting from the bottom of the camera, and at such distances apart that when the camera is placed upon its table C they shall enter and pass through the holes $a\ a'\ a''$, as seen in Fig. 1, and of such a length that when the camera is in the position represented in Fig. 2 the bottom of the latter shall be two and one-half inches above the surface of the table C.

$c$ is a fourth pin secured to the bottom of the camera, which enters a hole $d$ in the table, and which is furnished with a screw and nut by which its length may be adjusted and the back of the camera raised or lowered as may be required.

Operation: The instrument is first adjusted to the object in the position represented in Fig. 1. It is then moved into the position seen in Fig. 2, in which position it is evident that the center of the lens is two and one-half inches horizontally distant from its first position, at the same time that it is raised vertically an equal distance. Without moving the table C the camera is then pivoted upon the pin $b'$, which sinks into the depression $x$, the pin $b''$ being moved sufficiently in the enlargement $y$ of the groove $z$ at the same time that the pin $c$ is lengthened sufficiently to bring the object again within the range of the instrument, the other adjustments remaining as before. The first picture is now taken with the camera in the position represented in Fig. 2. The pins $b\ b'\ b''$ are then instantaneously placed in the holes $a\ a'\ a''$ and the second picture is taken with the instrument in the position shown in Fig. 1.

By this method, as before stated, stereoscopic pictures may be taken which are entirely free from the objections to which those are liable which are taken from two positions of the camera both in the same horizontal plane. It is evident that there are other methods which may be adopted for the purpose of moving the camera. For instance, it may be jointed to the table by means of hinge-links two and one-half inches in length, or thereabout, which shall allow the camera to be put into the two positions required; but that above described is the method which we prefer.

We do not intend to limit ourselves to the exact distance above specified between the points from which the pictures are taken, as this distance may be slightly varied without materially affecting the results; neither do we confine ourselves to the precise methods which we have adopted of carrying out our invention.

We do not claim taking pictures for the stereoscope with the camera placed in two different positions, or with two lenses attached to the same instrument when the two points are in the same horizontal line, as this has been done before; but What we do claim as our invention, and desire to secure by Letters Patent, is—

The within-described method of taking stereoscopic pictures in which the two positions of the camera are upon a line making an angle of forty-five degrees with the horizon.

ALBERT S. SOUTHWORTH.
JOSIAH J. HAWES.

Witnesses:
ALBERT F. HAWES,
EDWARD M. STEWART.